(12) United States Patent
Jann et al.

(10) Patent No.: US 10,534,635 B2
(45) Date of Patent: Jan. 14, 2020

(54) PERSONAL DIGITAL ASSISTANT

(71) Applicant: SAP SE, Walldorf (DE)

(72) Inventors: Florian Jann, Heidelberg (DE);
Matthias Kruse, Redwood City, CA (US); Martin Steiner, San Francisco, CA (US); Stefan Kirchfeld, Sunnyvale, CA (US); Michael Krenkler, Wiesloch (DE); Kai Richter, Mühltal (DE); Annette Jann, Heidelberg (DE); Emil Voutta, Heidelberg (DE); Maria Cabahug, Palo Alto, CA (US); Ioannis Grammatikakis, Maxdorf (DE); Tzanko Stefanov, Mountain View, CA (US); Dirk Wodtke, Soquel, CA (US)

(73) Assignee: SAP SE, Walldorf (DE)

( * ) Notice: Subject to any disclaimer, the term of this patent is extended or adjusted under 35 U.S.C. 154(b) by 177 days.

(21) Appl. No.: 15/392,375

(22) Filed: Dec. 28, 2016

(65) Prior Publication Data
US 2017/0329630 A1 Nov. 16, 2017

Related U.S. Application Data

(60) Provisional application No. 62/336,100, filed on May 13, 2016.

(51) Int. Cl.
*G06F 9/46* (2006.01)
*G06F 9/48* (2006.01)
(Continued)

(52) U.S. Cl.
CPC ........... *G06F 9/4843* (2013.01); *G06F 9/451* (2018.02); *G06F 9/453* (2018.02); *G06F 9/54* (2013.01);
(Continued)

(58) Field of Classification Search
CPC ..................................................... G06F 9/4843
(Continued)

(56) References Cited

U.S. PATENT DOCUMENTS

| 6,971,108 | B1 * | 11/2005 | Clark ..................... G06F 9/54 |
| | | | 719/313 |
| 2003/0135384 | A1 * | 7/2003 | Nguyen ................. G06Q 10/10 |
| | | | 705/301 |

(Continued)

FOREIGN PATENT DOCUMENTS

WO    WO 2015/200681 A1    12/2015

OTHER PUBLICATIONS

Extended European Search Report for European Application No. 17000784, dated Oct. 12, 2017; 16 pages.

*Primary Examiner* — Mehran Kamran
(74) *Attorney, Agent, or Firm* — Sterne, Kessler, Goldstein & Fox, P.L.L.C.

(57) ABSTRACT

Disclosed herein are system, method, and computer program product embodiments for managing completion of a task. An embodiment operates by receiving a selection of a collection configured to complete the task. The embodiment determines a context indicator for analyzing an application object in the selected collection. The embodiment processes the application object in based on the context indicator to generate information for completing the task. Another embodiment operates by receiving a selection of a collection configured to complete a task. The embodiment then determines that completion of the task requires solving a situation defined by a situation definition. The embodiment then identifies an anchor application object in the selected collection based on the situation definition. The embodiment
(Continued)

then generates related information and a set of actions for solving the situation based on the anchor application object and the situation definition.

20 Claims, 6 Drawing Sheets

(51) Int. Cl.
  *G06F 9/451* (2018.01)
  *G06N 20/00* (2019.01)
  *G06F 9/54* (2006.01)
  *G06Q 10/10* (2012.01)
  *G06Q 30/06* (2012.01)

(52) U.S. Cl.
  CPC ........... *G06N 20/00* (2019.01); *G06Q 10/103* (2013.01); *G06Q 30/06* (2013.01); *G06F 2209/482* (2013.01)

(58) Field of Classification Search
  USPC .......................................................... 718/100
  See application file for complete search history.

(56) References Cited

U.S. PATENT DOCUMENTS

| | | | |
|---|---|---|---|
| 2006/0123030 A1* | 6/2006 | Musteata | G06F 9/54 |
| 2009/0132653 A1* | 5/2009 | Niazi | G06Q 10/00 |
| | | | 709/204 |
| 2009/0300649 A1* | 12/2009 | Gopal | G06F 9/52 |
| | | | 719/313 |
| 2010/0250349 A1* | 9/2010 | Zhan | G06Q 30/02 |
| | | | 705/14.4 |
| 2013/0041653 A1* | 2/2013 | Tseng | G06Q 50/01 |
| | | | 704/9 |
| 2013/0138424 A1* | 5/2013 | Koenig | G06F 17/271 |
| | | | 704/9 |
| 2015/0135085 A1* | 5/2015 | Shoham | G06F 3/0482 |
| | | | 715/739 |
| 2016/0048602 A1* | 2/2016 | Yastrebenetsky | |
| | | | G06F 17/30864 |
| | | | 715/234 |
| 2016/0078354 A1* | 3/2016 | Petri | G06N 5/02 |
| | | | 706/50 |
| 2016/0092245 A1* | 3/2016 | Hogue | G06F 9/4446 |
| | | | 715/711 |
| 2017/0075514 A1* | 3/2017 | Lethif | G06F 3/048 |
| 2017/0109136 A1* | 4/2017 | Colle | G06F 8/20 |
| 2017/0132200 A1* | 5/2017 | Noland | G06F 17/248 |
| 2017/0192512 A1* | 7/2017 | Karmon | G06F 3/017 |

* cited by examiner

PERSONAL DIGITAL ASSISTANT

CROSS-REFERENCE TO RELATED APPLICATION

The present application claims the benefit of provisional U.S. Patent Application No. 62/336,100, titled "A Personal Digital Assistant" filed on May 13, 2016, which is incorporated herein by reference in its entirety.

BACKGROUND

Background

Computer users typically work on tasks that involve multiple complex steps. For example, a purchasing agent may want to create a purchase order. To create a purchase order, the purchasing agent may need to identify a list of suppliers, determine whether a specific supplier sells the needed type and quantity of products, and process a bill from the supplier for the products.

To create the purchase order, the purchasing agent may use several different software applications. For example, the purchasing agent may search a list of suppliers using a contact management software application. Similarly, the purchasing agent may process a supplier invoice using an accounting software application.

But a user may not think in terms of different software applications. Rather, the user may think in terms of completing the task. While different software applications provide predefined functionality for completing parts of a task, they may not enable the user to complete the task according to their personal way of working. Specifically, a user may have to remember relevant information when switching between different applications. In addition, a user may be forced to complete part of the task in one application before switching to another application. Finally, the user may not receive relevant predictions, notifications, and actions for one application while working in another application.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for managing completion of a task. An embodiment operates by receiving a selection of a collection in collection list from a user. The embodiment determines a context indicator in response to receiving the selection. The embodiment then processes an application object in the selected collection based on the context indicator. The embodiment then provides information based on the processed application object to a user.

Another embodiment operates by receiving a selection of a collection in collection list from a user. The other embodiment determines a condition in a situation definition is valid. The other embodiment then identifies an anchor application object in the selected collection based the situation definition. The other embodiment then generates related information and a set of actions from the anchor application object. The other embodiment then provides the related information and the set of actions for output to a user.

Figure 1:
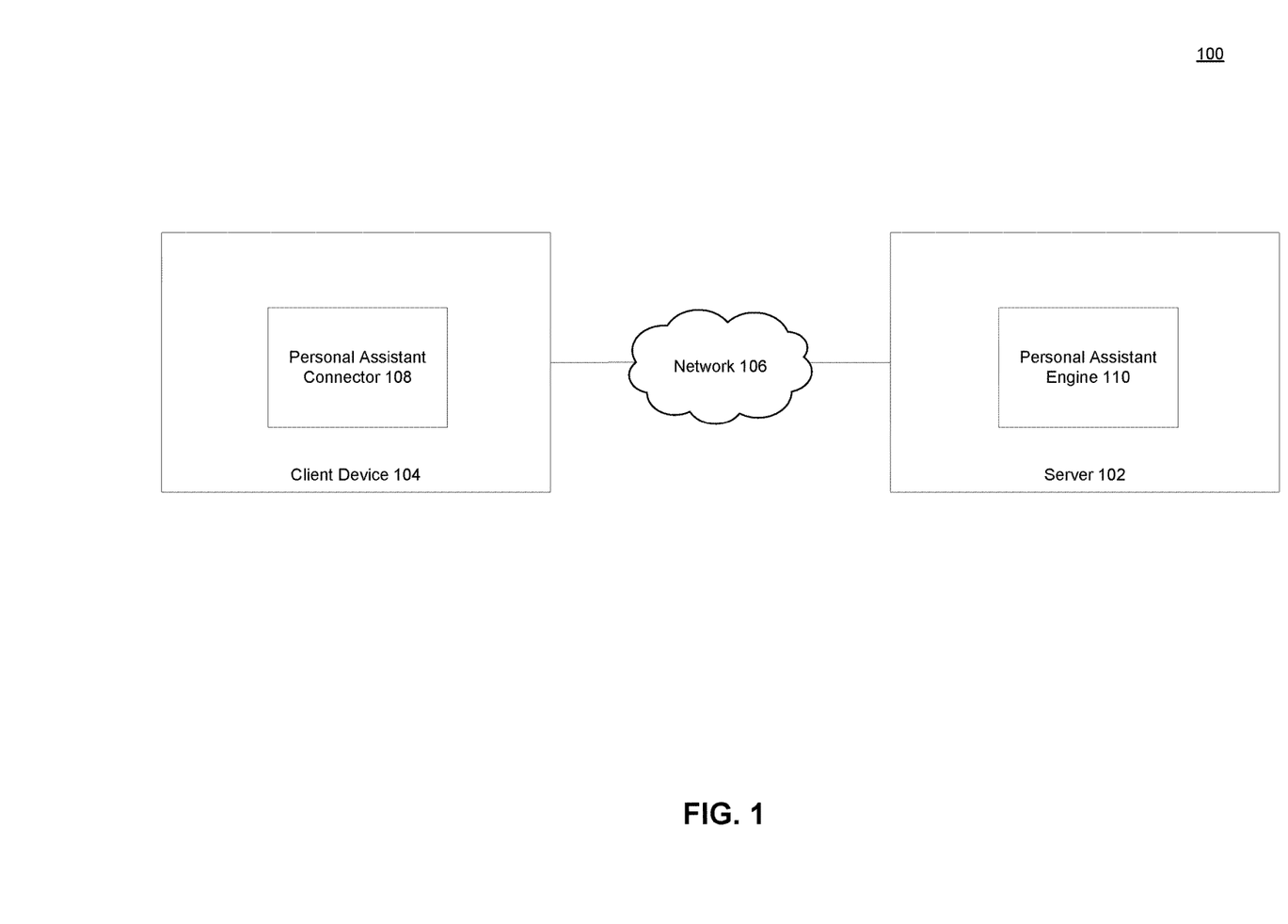
FIG. 1 is a block diagram of a personal assistant system for managing completion of a task, according to some embodiments.

FIG. 1 is a block diagram of a personal assistant system 100 for managing completion of a task, according to some embodiments. Personal assistant system 100 may bridge the gap between predefined application functionality in separate applications and the personal way in which a user works on a task.

In FIG. 1, personal assistant system 100 includes server 102 and client device 104. Server 102 may communicate with client device 104 operated by a user over network 106. Network 106 may be any network or combination of networks including the Internet, a local area network (LAN), a wide area network (WAN), a wireless network, a cellular network, or various over types of networks as would be appreciated by a person of ordinary skill in the art.

In some embodiments, client device 104 may be any computing device that can communicate with server 102 including a desktop computer, laptop computer, tablet computer, smartphone, personal digital assistant, wearable electronic device, or various other electronic devices as would be appreciated by a person of ordinary skill in the art. Client device 104 may include personal assistant connector 108. Personal assistant connector 108 may output a user interface on client device 104 for managing a task in personal assistant engine 110. Specifically, personal assistant connector 108 may output a collection data structure corresponding to the task on client device 104. In some embodiments, personal assistant connector 108 may be a software application that presents a user interface. For example, personal assistant connector 108 may be a web application.

In some embodiments, personal assistant connector 108 may receive user input to create, modify, or delete a collection data structure corresponding to a task in personal assistant engine 110. Personal assistant connector 108 may receive user input to perform an action related to a task. Personal assistant connector 108 may output a prediction or notification related to a task.

Figure 2:
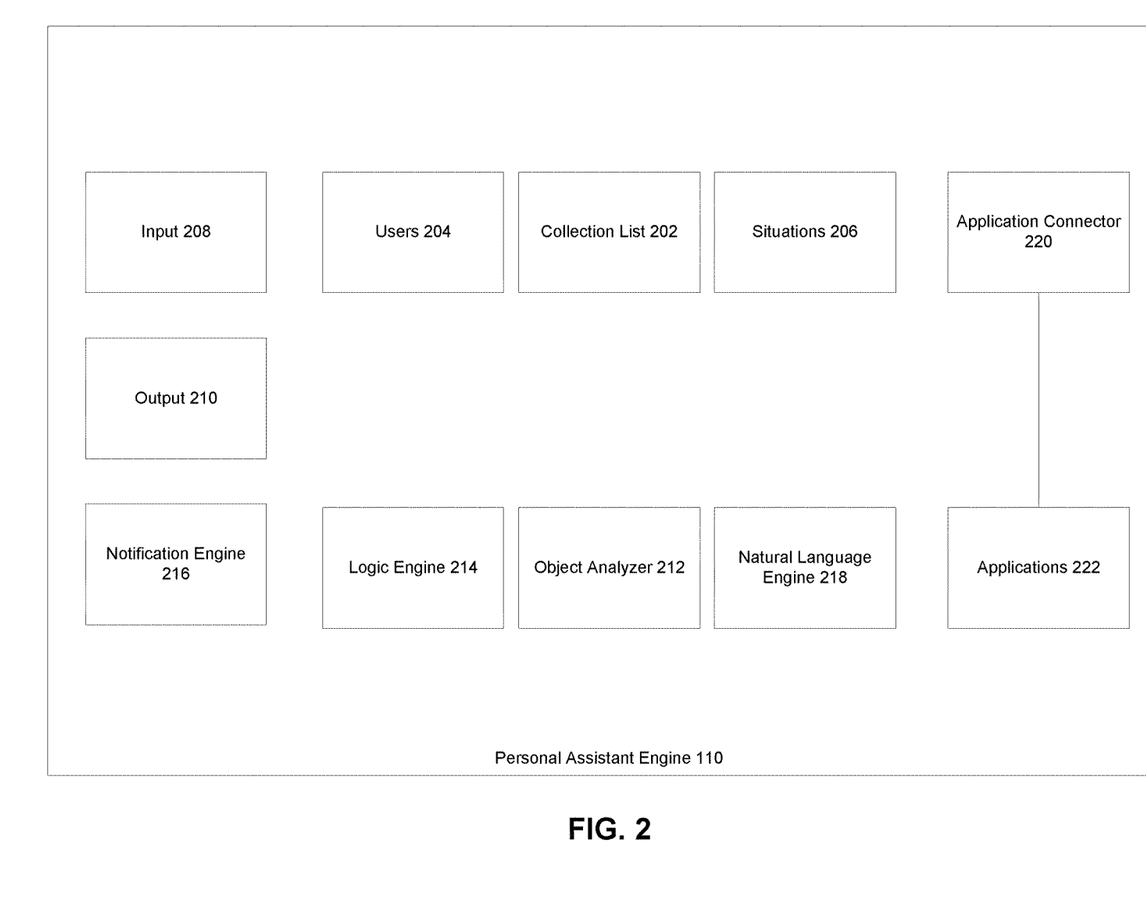
FIG. 2 is a block diagram of personal assistant engine, according to some embodiments.

FIG. 2 is a block diagram of personal assistant engine 110, according to an example embodiment. In some embodiments, personal assistant engine 110 may include a collection list 202, users 204, situations 206, input module 208, output module 210, object analyzer 212, logic engine 214, notification engine 216, natural language engine 218, application connector 220, and applications 222.

In some embodiments, personal assistant engine 110 manages one or more collections in collection list 202. Collection list 202 may be an array, linked list, or various other data structure as would be appreciated by a person of ordinary skill in the art.

In some embodiments, a collection is a data structure that may represent a user task in personal assistant engine 110. For example, a collection may represent a purchase order issued by a business to a supplier. A collection may bridge the gap between predefined software application functionality and the personal way in which a user works by grouping together one or more application objects according to a user task. An application object may represent a logical entity in a software application.

Figure 3:
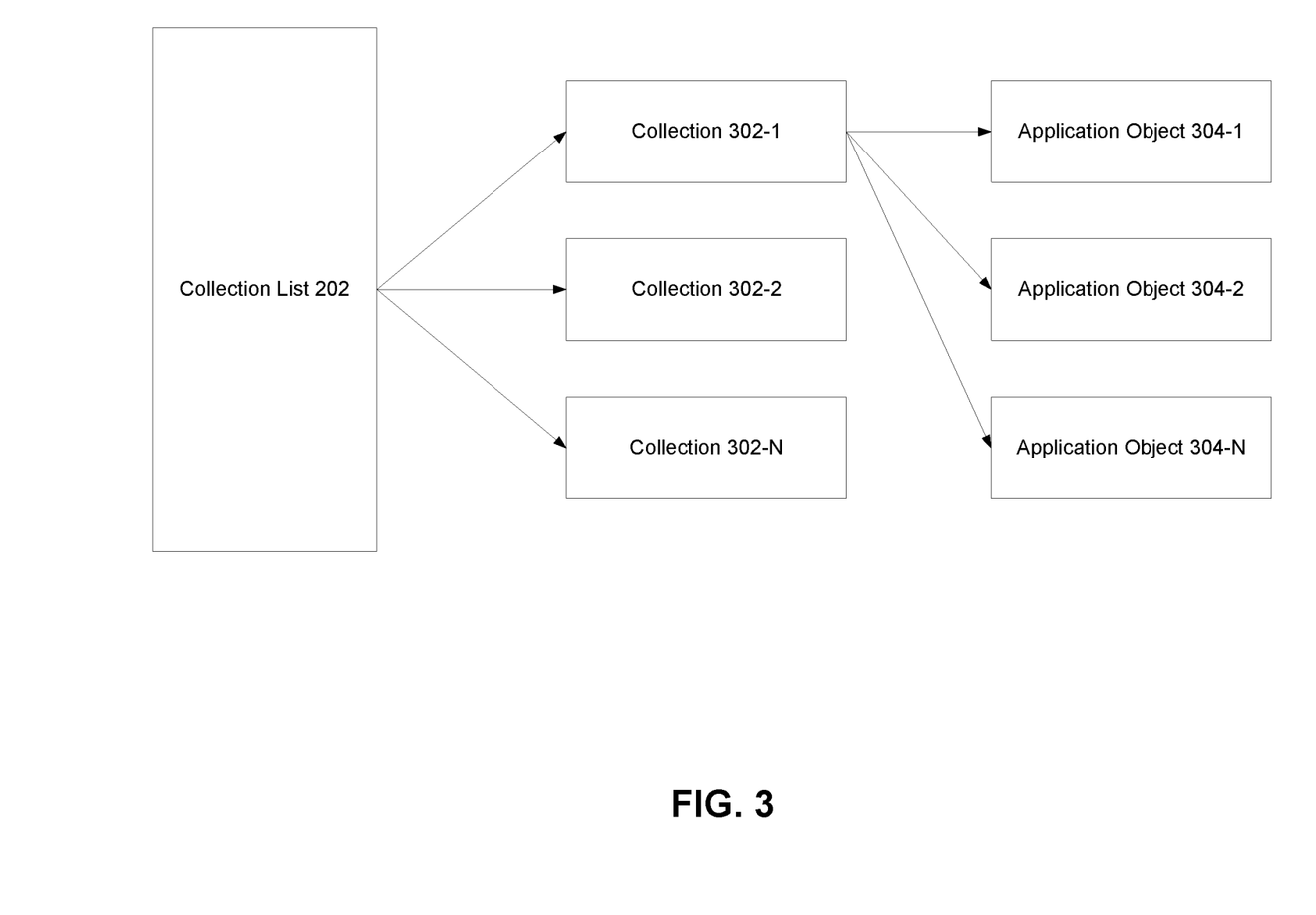
FIG. 3 is a block diagram of collection list data structure, according to some embodiments.

FIG. 3 is a block diagram of collection list 202, according to an example embodiment. Collection list 202 includes one or more collections 302-1 to 302-N. A collection 302 may be associated with a user in users 204.

In some embodiments, a collection 302 may represent a user task. A collection 302 may include a collection title. A collection title may be a text description of a user task. A collection 302 may include a collection identifier that identifies the collection 302 to personal assistant engine 110. In some embodiments, a collection identifier may be a universally unique identifier (UUID). A collection 302 may include a user identifier that identifies a user in users 204 that created the collection 302.

In some embodiments, a collection 302 may include one or more application objects 304 related to the task of the collection 302. An application object 304 may be a logical entity in a software application in applications 222. For example, an application object 304 may be chat message in an instant messaging application, a note in a note taking application, a contact in a contact management application note, an image in a photo management application, an alert in an event planning application, an activity in a calendar application, a screenshot, or an aggregator of one or more other application objects 304.

In some embodiments, a collection 302 may include one or more application objects 304 from the same software application. In some embodiments, a collection 302 may include one or more application objects 304 from different software applications.

In some embodiments, personal assistant engine 110 may store one or more collections 302 and one or more application objects 304 in a database. The database may be a relational database, object-oriented database, hierarchical database, network database, or various other type of database as would be appreciated by a person of ordinary skill in the art.

In some embodiments, an application object 304 may include a set of fields and a set of actions. A field in an application object 304 may be a data item in the associated logical entity. For example, an application object 304 for an email message may include an address field, from field, subject field, and message body field.

An action in an application object 304 may include application logic corresponding to the application in applications 222. For example, an application object 304 may represent an email message and the set of actions may include send the email, reply to the email, forward the email, and delete the email. In some embodiments, executing an action may launch a component of the application or a new application in applications 222. In some other embodiments, executing an action may open a web page, dial a telephone number, or various other actions as would be appreciated by a person of ordinary skill in the art.

In some embodiments, an application object 304 may include an application object identifier. The application object identifier may be an identifier that identifies the application object 304 to personal assistant engine 110. In some embodiments, the application object identifier may be a universally unique identifier (UUID).

In some embodiments, an application object 304 may include an intent attribute. The intent attribute may control how output module 210 outputs the application object 304. The intent attribute may also specify to input module 208 how a user navigates the application object 304.

In some embodiments, an application object 304 may include an application object type. The application object type may identify a type of logical entity in an application in applications 222. The application object type may identify the set of fields and set of actions accessible in the application object 304.

In some embodiments, application connector 220 is an application programming interface (API) to applications 202. Specifically, application connector 202 may enable communication between an application object 304 and a logical entity in an application in applications 222. Application connector 202 may make the logical entity accessible from the application object 304. Specifically, application connector 220 exposes data items of the logical entity as a set of fields in the application object 304 and application logic in the associated application as a set of actions in application object 304.

In some embodiments, application connector 220 exposes data items and application logic to an application object 304 based on a manifest file. Application connector 220 may select a manifest file from a set of manifest files based on an application object type of the application object 304. The manifest file may define a set of mappings between a set of data items of the logical entity and the set of fields in the application object 304. The manifest file may also define a set of mappings between application logic in the associated application and the set of actions accessible from the application object 304.

In some embodiments, the manifest file may be an Extensible Markup Language (XML) file. In some embodiments, the set of mappings may specified as a set of annotations of the data items of the logical entity and the application logic of the application.

In some embodiments, input module 208 may receive user input from personal assistant connector 108 to create, modify, or delete a collection 302 or application object 304 in collection list 202. In some embodiments, the user input may textual data. In other some embodiments, the user input may be voice, gestures, touch data, visual data, or other types of user input as would be appreciated by a personal of ordinary skill in the art.

In some embodiments, the user input may be content data or a user command. For example, content data may include a first and last name for a contact, a message body of an email, and a date and time for an event. A user command may include a create collection command, delete application object command, and delete situation command. As would be appreciated by a personal of ordinary skill in the art, input module 208 may receive various other types of user command.

In some embodiments, input module 208 may convert user input from one Balm into another. For example, in some embodiments, input module 208 may convert a voice user input into textual content data using a voice recognition engine. In some other embodiments, input module 208 may convert a gesture user input into a user command.

In some embodiments, output module 210 may generate a user interface for personal assistant connector 108. In some embodiments, the user interface may be a visual user interface. In some other embodiments, the user interface may be an auditory user interface. For example, output module 210 may output textual content data as audio content data using a text-to-speech recognition engine.

In some embodiments, output module 210 generates a user interface based on a template associated with an application object type of an application object 304. The template may specify how to layout out user interface elements for the application object 304. The template may also specify what data to display from the application object 304 and when to display the data.

In some embodiments, the template may specify the layout out of user interface elements for the application object 304 based on one or more device characteristics of client device 104. A device characteristic may include the display screen size of client device 104, the display screen orientation of client device 104, or various other device characteristics of client device 104 as would be appreciated by a person of ordinary skill in the art. Thus, the template may enable output module 210 to provide a scalable user interface on different types of client device 104.

In some embodiments, object analyzer 212 may save user time by auto filling one or more fields of an application object 304 in a collection 302. Object analyzer 212 may also save user time by proposing one or more actions associated with an application object 304. Object analyzer 212 may also save user time by generating notifications for application object 304. Object analyzer may also save user time by generating a new application object 304 automatically or based on user demand. Thus, object analyzer 212 enables a collection 302 to be a living, gradually growing artifact that accompanies a user on their way from issue to solution.

In some embodiments, object analyzer 212 may determine a context indicator in order to analyze an application object 304. Object analyzer 212 may determine the context indicator based on an application object type of the application object 304, the associated collection 302 of application object 304, an application object 304 currently being output to client device 104 by output module 210, activity information of the user interacting with the application object 304, a user role of the user interacting with the application object 304, preferences of the user interacting with the application object 304, and various other criteria as would be appreciated by a person of ordinary skill in the art. In some embodiments, object analyzer 212 may analyze the context indicator criteria using natural language engine 216, machine learning techniques, or both.

In some embodiments, object analyzer 212 auto fills one or more fields of an application object 304 with content from the associated collection 302. In some other embodiments, object analyzer 212 may auto fill the one or more fields of the application object 304 based on the determined context indicator.

In some embodiments, object analyzer 212 may provide one or more proposed actions for an application object 304. Object analyzer 212 may generate the one or more proposed actions from the set of actions associated with the application object 304. Object analyzer 212 may also generate the one or more proposed actions from a set of actions associated with a different application object 304 that is related to the application object 304. Object analyzer 212 may provide the proposed actions to a user for execution based on the determined context indicator. Object analyzer 212 may rank the one or more proposed actions based on the determined context indicator.

In some embodiments, object analyzer 212 may generate a notification for an application object 304. Object analyzer 212 may generate the notification from one or fields in the application object 304 and various criteria associated with application object 304. Object analyzer 212 may provide the notification to notification engine 216 based on the determined context indicator. Notification engine 214 may deliver the notification to output module 210 for output on client device 104.

In some embodiments, object analyzer 212 may proactively generate a new application object 304 by analyzing an existing application object 304 and highlighting one or more matching application objects 304 in collection list 202. Specifically, object analyzer 212 may parse one or more fields of an application object 304 in a collection 302. In some embodiments, object analyzer 212 may parse the one or more fields of the application object 304 using natural language engine 216. In some embodiments, object analyzer 212 may parse the one or more fields of the application object 304 based on the determined context indicator.

In some embodiments, object analyzer 212 may compare one or more parsed fields in the application object 304 to fields in other application objects 304. The other application objects 304 may be in the same or a different collection than the parsed application object 304.

In some embodiments, object analyzer 212 may add the other application objects 304 to the same collection 302 as the parsed application object 304 based on the parsed application object 304 and the one or more other application objects 304 sharing identical field values. In some other embodiments, object analyzer 212 may provide a user an option to add the other application objects 304 to the same collection 302 as the parsed application object 304 based on the parsed application object 304 and the one or more other application objects 304 sharing identical field values.

In some embodiments, object analyzer 212 may add other application objects 304 to the same collection 302 as the parsed application object 304 based on the parsed application object 304 and the other application objects 304 sharing similar field values. In some other embodiments, object analyzer 212 may provide a user a selectable option to add the other application objects 304 to the same collection 302 as the parsed application object 304 based on the parsed application object 304 and the other application objects 304 sharing similar field values.

In some embodiments, object analyzer 212 may provide a selectable option to a user to generate a new application object 304 based on the parsed application object 304 having a field value similar to an existing application object 304. For example, object analyzer 212 may provide a selectable option to a user to generate a new contact application object based on a person name being in an email application object.

In some embodiments, object analyzer 212 may parse an application object 304 upon creation. In some other embodiments, object analyzer 212 may parse an application object 304 in a collection 302 at regular time intervals.

In some embodiments, logic engine 214 performs situational analysis across a collection 302. Situation analysis may enable improved user workflow across one or more different application objects 304. Specifically, logic engine 214 may identify a situation in which a user in users 204 may need additional information, or may need to take an action to complete a task. In response, logic engine 214 may provide additional related information and a set of actions to the user to solve the situation.

For example, logic engine 214 may identify an overdue purchase order and provide additional related information to a purchasing agent user regarding the overdue purchase order. The related information may include supplier information. The logic engine 214 may also identify one or more actions the purchasing agent may need to take to solve the overdue purchase order situation. The actions may include adjusting the purchase order quantity, canceling the purchase order, splitting the purchase order, and ignoring the overdue purchase order. Thus, logic engine 214 may provide related information and actions for solving a task to a user at the right time.

In some embodiments, logic engine 214 performs situational analysis according to one or more situation definitions in situations 206. In some embodiments, a user in users 204 may create a situation definition in situations 206. In some other embodiments, logic engine 214 may generate a situation definition in situations 206 based on a machine learning analysis of collections list 202.

In some embodiments, a situation definition includes one or more anchor application objects, a condition, a situation trigger, related information, and one or more actions capable of being performing by a user in users 204.

In some embodiments, an anchor application object is an application object 304 in a collection 302. An anchor application object may act as an entry point for retrieving related information and a set of actions. In some embodiments, the related information may include one or more related application objects 304. In some other embodiments, the related information may include information stored outside collection list 202.

In some embodiments, the set of actions may include one or more actions defined for the one or more anchor application objects. In some other embodiments, the set of actions may include the one or more actions for application objects 304 related to the one or more anchor application objects.

In some embodiments, an anchor application object may include a path expression that defines one or more application object 304 that are related to the anchor application object. In some embodiments, a path expression may relate one or more application objects to the anchor application object based on an application object type. Logic engine 214 may evaluate the path expression to retrieve one or more related application objects 304 having the application object type.

In some embodiments, an anchor application object may include an external link to information stored outside collection list 202. For example, an anchor application object may include an external link to a related web page.

In some embodiments, a condition in a situation definition is an application rule, query, or an application relevant event. For example, a condition may be an overdue purchase order. As would be appreciated by a person of ordinary skill in the art, a condition may be specified using various notational forms.

In some embodiments, a trigger controls when a condition is evaluated. A trigger may specify to logic engine 214 that the associated condition needs to be evaluated periodically such as once a week, daily, or hourly. In some other embodiments, a trigger may specify a system update event such as the creation of a new application object 304, e.g., a new purchase order application object. In some other embodiments, a trigger may be an active request by a user in users 204 to have the latest information from personal assistant engine 110.

In some embodiments, a situation definition may include a textual description of the situation to solve. The textual description may include corporate rules, department rules, or links to relevant process information. In some embodiments, a situation definition may include a situation type.

In some embodiments, a situation definition includes one or more tags to form a group of situations having similar attributes. This enables assigning a group of situations to groups of users or individual users. A tag may be an application domain, application area, department, group of users, list of individual users, or various other tag types as would be appreciate by a person of ordinary skill in art.

In some embodiments, a situation definition may include a calculation method for determining a business relevance score. A business relevance score may control which users in users 204 receive the related information and set of actions associated with the situation.

In some embodiments, logic engine 214 may evaluate the calculation method for determining the business relevance score using one or more fields in the anchor application object. In some other embodiments, logic engine 214 may evaluate the calculation method for determining the business relevance score using application logic and rules of an organization.

In some embodiments, a situation definition may include a calculation method for determining a user relevance score. A user relevance score may control which users in users 204 receive the related information and set of actions associated with the situation. In some embodiments, logic engine 214 may evaluate the calculation method for determining a user relevance score based on a user identifier associated with the anchor application object. Specifically, logic engine 214 may use the user identifier to retrieve user information from users 204. Logic engine 214 may then use the received user information in evaluating the calculation method for determining the user relevance score.

In some embodiments, the user information may include a history of user interactions with the anchor application object, tags assigned to the anchor application object, user activity associated with application objects 304 related to the anchor application object, the user assigned to the anchor application object, the role of the user assigned to the anchor application object, and various other criteria as would be appreciated by a person of ordinary skill in the art.

In some embodiments, the situation definition may include notification criteria. The notification criteria may control when logic engine 214 presents related information and a set of actions of a situation to a user via notification engine 216. In some embodiments, notification criteria may include a relevance value and threshold value. The relevance value may be calculated from a business relevance score, user relevance score, or a combination of both. In some embodiments, logic engine 214 may present the related information and the set of actions of a situation to a user when the relevance value exceeds the threshold value.

In some embodiments, logic engine 214 evaluates a situation condition based on one or more application objects 304. Logic engine 212 may generate a situation instance with related information and a set of actions when the associated condition is valid.

In some embodiments, logic engine 214 may present a situation instance to a user based on a business relevance score, a user relevance score, or both. In some embodiments, logic engine 214 presents all related information and actions required for handling the situation instance to a user.

In some embodiments, output module 210 generates a user interface for outputting a situation instance based on a template associated with the definition of the situation. The template may specify to output module 210 how to layout out user interface elements for the situation. The template may also specify to output module 210 what data to display from the situation and when to display the data.

In some embodiments, the template may specify the layout out of user interface elements for the situation instance based on one or more device characteristics of client device 104. A device characteristic may include the display screen size of client device 104, the display screen orientation of client device 104, or various other device characteristics of client device 104 as would be appreciate by a person of ordinary skill in the art.

Figure 4:
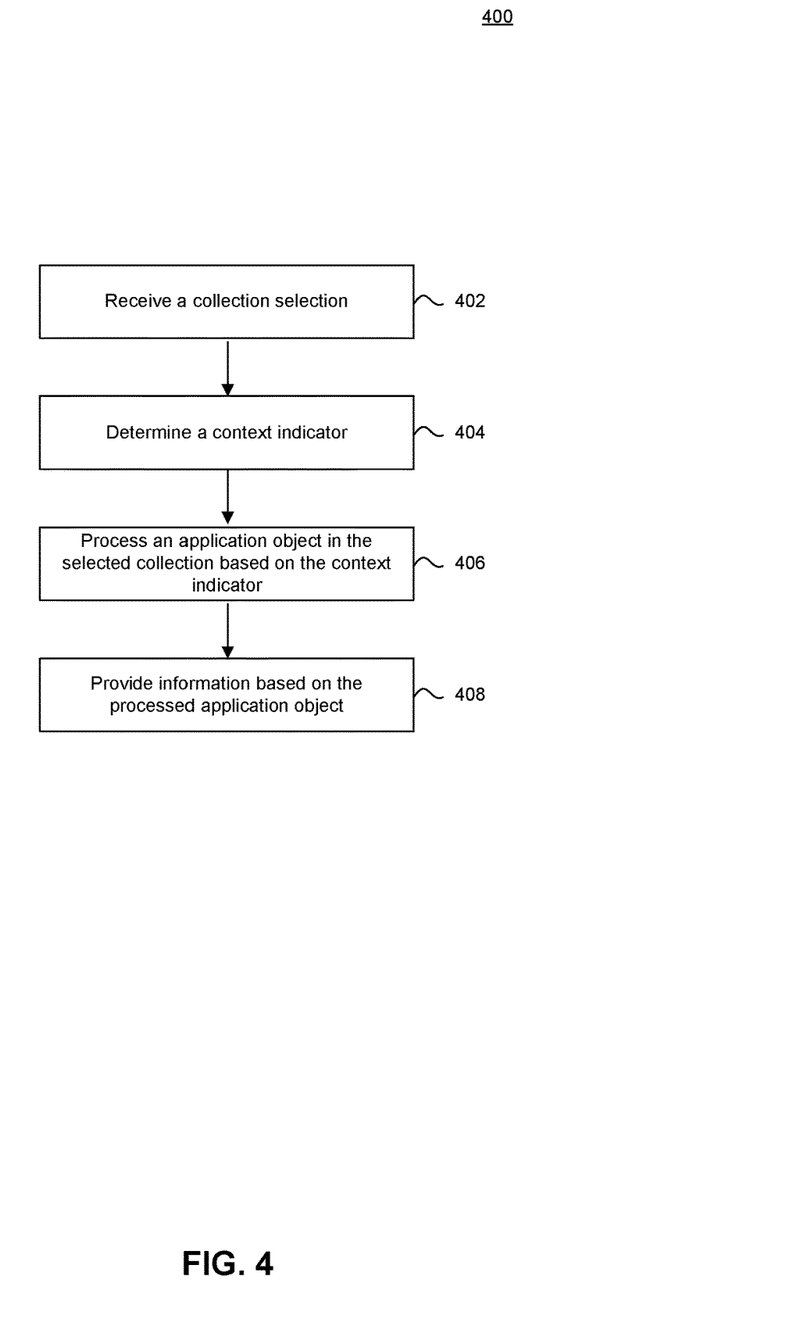
FIG. 4 is a flowchart for a process for managing a task using personal assistant engine, according to an embodiment

FIG. 4 is a flowchart for a method 400 for managing a task using personal assistant engine 110, according to an embodiment. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 2 and 3. However, method 400 is not limited to that example embodiment.

In 402, input module 208 receives a selection of a collection 302 in collection list 202 from a user in users 204. The selection may comprise a collection identifier that identifies the collection 302 in collection list 202.

In 404, object analyzer 212 determines a context indicator in order to analyze an application object 304 in the selected collection 302. In some embodiments, the object analyzer 212 may determine the context indicator based an application object type of the application object 304, the selected collection 302, activity information of the user interacting with the application object 304, a user role of the user interacting with the application object 304, preferences of the user interacting with the application object 304, and various other criteria as would be appreciated by a person of ordinary skill in the art.

In 404, object analyzer 212 processes the application object 304 in the selected collection 302 based on the context indicator. Specifically, object analyzer 212 may auto fill one or more fields of the application object 304. Object analyzer 212 may also generate one or more proposed actions for the application object 304. Object analyzer 212 may also generate a new application object based on the application object 304. Object analyzer 212 may also generate a notification based on the application object 304.

In some embodiments, object analyzer 212 may process the application object 304 upon creation of the application object 304 in the collection 302. In some other embodiments, object analyzer 212 may process the application object 302 in the collection 302 at periodic intervals.

In 406, object analyzer 212 provides information based on the processed application object 304 to output module 210 for output to a user.

Figure 5:
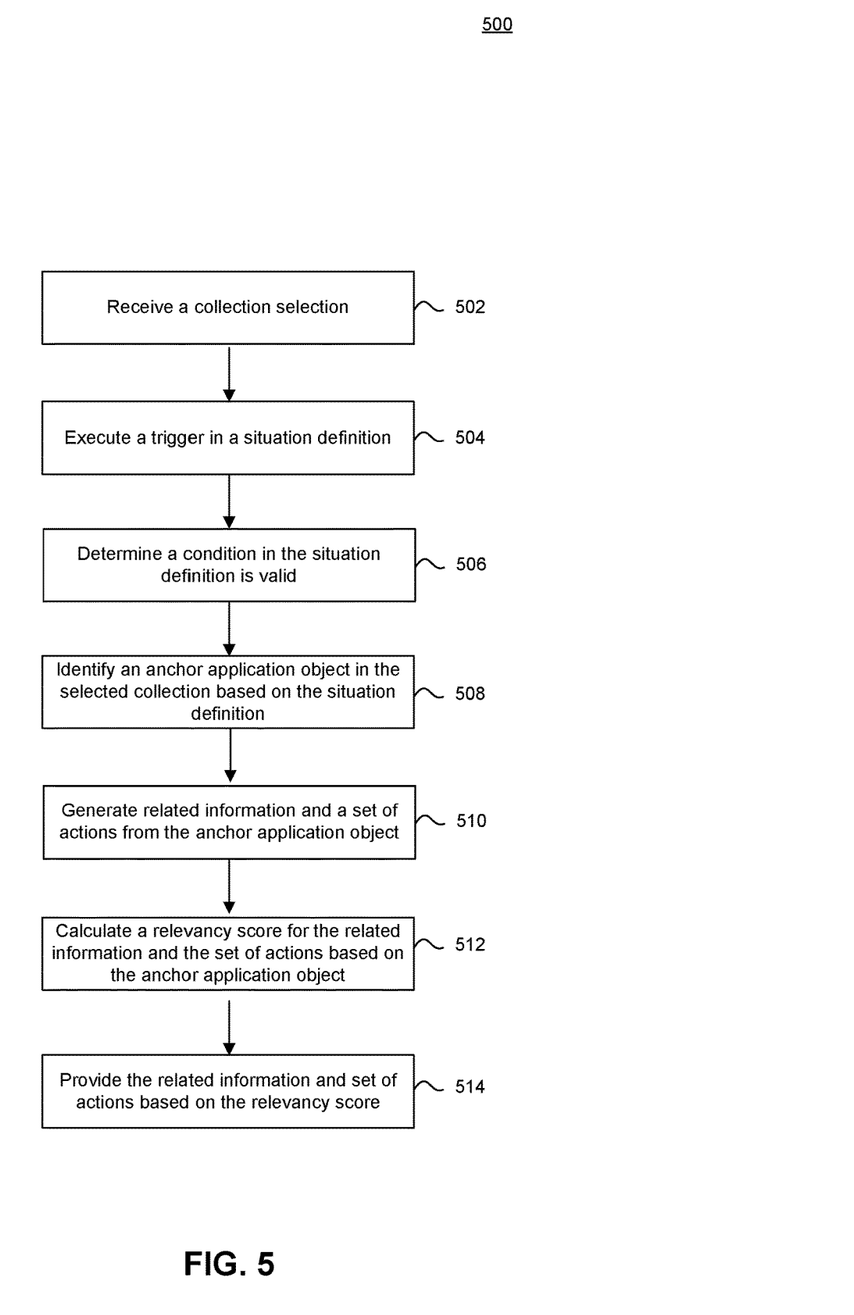
FIG. 5 is a flowchart for a process for performing situational analysis using personal assistant engine.

FIG. 5 is a flowchart for a method 500 for performing situational analysis using personal assistant engine 110, according to an embodiment. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIGS. 2 and 3 However, method 500 is not limited to that example embodiment.

In 502, input module 208 receives a selection of a collection 302 in collection list 202 from a user in users 204. The selection may comprise a collection identifier that identifies the collection 302 in collection list 202.

In 504, logic engine 214 executes a trigger in a situation definition associated with the selected collection 302.

In 506, logic engine 214 determines a condition in a situation definition in situations 206 is valid in response to the executed trigger.

In 508, logic engine 214 identifies an anchor application object in the selected collection 302 based the situation definition.

In 510, logic engine 214 generates related information and a set of actions from the anchor application object according to the situation definition. The related information may include one or more related application objects 304. The related information may also include information stored outside collection list 202. The set of actions may include one or more actions defined for the one or more anchor application object. The set of actions may include the one or more actions for one or more application objects 304 related to the anchor application object.

In 512, logic engine 214 optionally calculates a relevancy score for the related information and the set of actions based on the anchor application object and the situation definition. In some embodiments, the relevancy score may be a business relevance score, user relevancy score, or a combination of both.

In 514, logic engine 214 provides the related information and the set of actions to output module 210 for output to a user based on the relevancy score.

Figure 6:
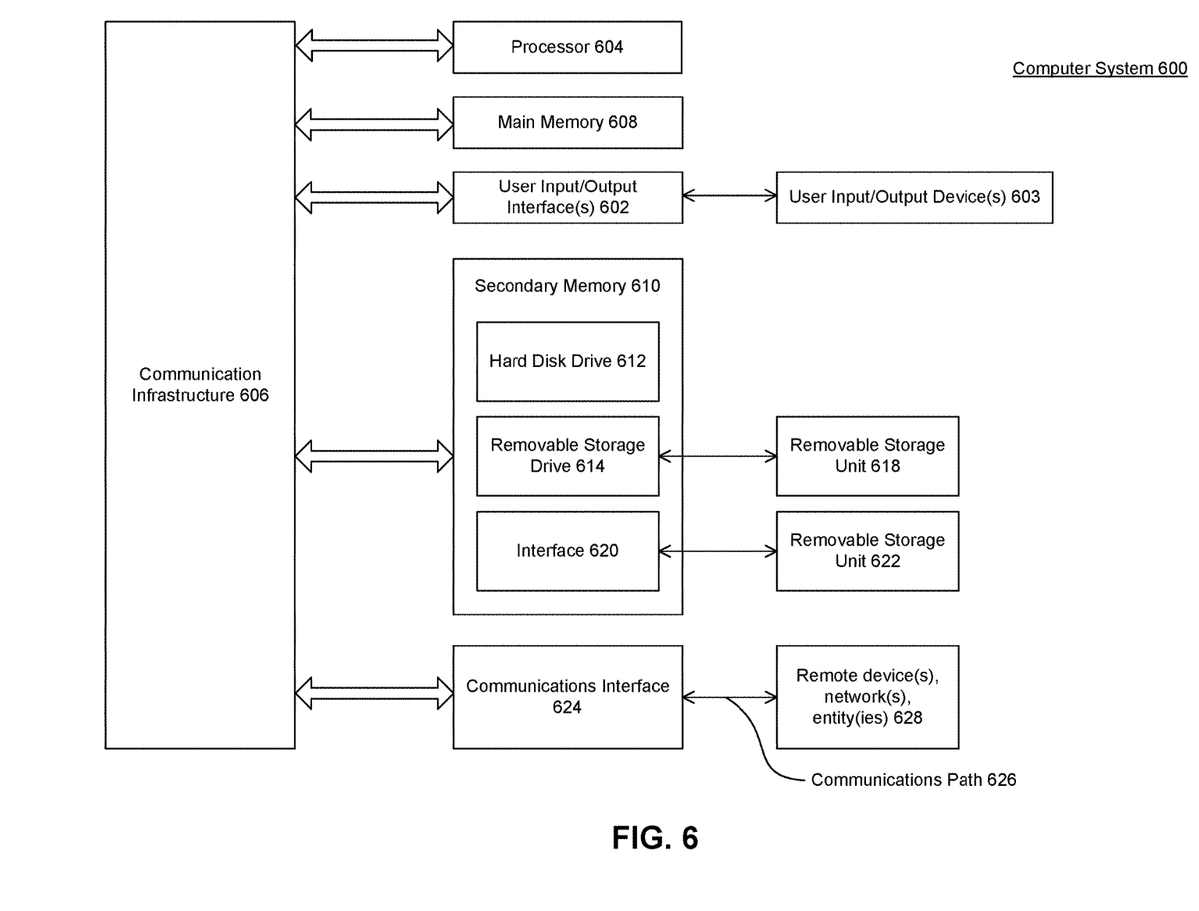
FIG. 6 is an example computer system useful for implementing various embodiments.

Various embodiments can be implemented, for example, using one or more computer systems, such as computer system 600 shown in FIG. 6. Computer system 600 can be used, for example, to implement method 400 of FIG. 4. For example, computer system 600 can process an application object in a selected collection based on a context indicator. Computer system 600 can further generate related information and a set of actions from an application object based on a situation definition, according to some embodiments. Computer system 600 can be any computer capable of performing the functions described herein.

Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for managing completion of a task in a personal assistant application, comprising:
   receiving a selection of a collection configured to complete the task, the collection including a first application object comprising a field exposing a data item of a first logical entity of a first application and an action exposing action logic of the first application;
   generating a situation definition for a solving a situation based on analysis of a plurality of collections, the situation definition defining a trigger and a condition;
   determining that completion of the task requires solving the situation defined by the situation definition, the determining comprising:
      executing the trigger defined in the situation definition, wherein the trigger controls evaluation of the condition defined in the situation definition; and
      in response to executing the trigger, determining the condition is valid;

in response to the determining that completion of the task requires solving the situation, identifying the first application object in the collection based on the situation definition;

generating related information and an action for solving the situation based on the first application object and the situation definition, the generating comprising:
receiving a second application object associated with the first application object based on a path expression in the situation definition,
wherein the second application object represents a second logical entity in a second application; and
receiving, from the second application, the action for solving the situation object based on a manifest file associated with the second application; and
outputting the related information and the action for solving the situation.

2. The method of claim 1, the outputting comprising:
generating a user interface for displaying the action for solving the situation based on a template associated with the second application object.

3. The method of claim 1, the further comprising:
generating a notification based on the first application object.

4. The method of claim 1, wherein generating the situation definition comprises performing machine learning analysis on the collection.

5. The method of claim 1, further comprising:
creating the first application object in the collection based on a user input, wherein the user input includes at least one of textual data, voice data, gesture data, visual data, or a combination of textual data, voice data, gesture data, and visual data.

6. The method of claim 1, wherein the collection comprises a plurality of homogeneous application objects or a plurality of heterogeneous application objects.

7. The method of claim 1, wherein the condition includes an application rule, query, or application relevant event.

8. A system, comprising:
a memory; and
at least one processor coupled to the memory and configured to:
receive, by a first application, a selection of a collection configured to complete a task, the collection including an anchor application object comprising a field exposing a data item of a logical entity of second application and an action exposing action logic of the second application;
generate a situation definition for a solving a situation based on analysis of a plurality of collections, the situation definition defining a trigger and a condition;
determine, by the first application, that completion of the task requires solving the situation defined by the situation definition, wherein to determine the at least one processor is further configured to:
execute the trigger defined in the situation definition, wherein the trigger controls evaluation of the condition defined in the situation definition; and
determine the condition is valid in response to executing the trigger;
identify, by the first application, the anchor application object in the collection based on the situation definition in response to completion of the task requiring solving the situation;
generate, by the first application, related information and a set of actions for solving the situation based on the anchor application object and the situation definition; and
output, by the first application, the related information and the set of actions for solving the situation, wherein to output the at least one processor is further configured to:
generate a user interface for displaying the related information and the set of actions for solving the situation based on a template associated with the situation definition.

9. The system of claim 8, wherein to generate the situation definition, the at least one processor is further configured to perform machine learning analysis on the collection.

10. The system of claim 8, wherein the at least one processor is configured to:
generate a notification based on the first application object.

11. The system of claim 8, wherein the at least one processor is configured to:
create the first application object based on a user input, wherein the user input includes at least one of textual data, voice data, gesture data, visual data, or a combination of textual data, voice data, gesture data, and visual data.

12. The system of claim 8, wherein the condition includes an application rule, query, or application relevant event.

13. The system of claim 8, wherein the collection comprises a plurality of homogeneous application objects or a plurality of heterogeneous application objects.

14. The system of claim 8, wherein the at least one processor is configured to calculate a relevancy score based on the first application object and the situation definition, and wherein to output the at least one processor is configured to:
output a subset of the related information and the action for solving the situation based on the relevancy score.

15. A non-transitory computer-readable device having instructions stored thereon that, when executed by at least one computing device, causes the at least one computing device to perform operations comprising:
receiving, by a first application, a selection of a collection configured to complete a task, the collection including an anchor application object comprising a field exposing a data item of a logical entity of a second application and an action exposing action logic of the second application;
generating a situation definition for a solving a situation based on analysis of a plurality of collections, the situation definition defining a trigger and a condition;
determining, by the first application, that completion of the task requires solving the situation defined by the situation definition, the determining comprising:
executing the trigger defined in the situation definition, wherein the trigger controls evaluation of the condition defined in the situation definition;
in response to executing the trigger, determining the condition is valid;
in response to the determining that completion of the task requires solving the situation, identifying, by the first application, the anchor application object in the collection based on the situation definition;
generating, by the first application, related information and a set of actions for solving the situation based on the anchor application object and the situation definition;

calculating a relevancy score based on the anchor application object and the situation definition; and outputting, by the first application, a subset of the related information and the set of actions for solving the situation based on the relevancy score.

16. The non-transitory computer-readable device of claim 15, the outputting comprising:

generating a user interface for displaying the subset of the related information and the set of actions for solving the situation based on a template associated with the situation definition.

17. The non-transitory computer-readable device of claim 15, the operations further comprising:

creating the first application object in the collection based on a user input, wherein the user input includes at least one of textual data, voice data, gesture data, visual data, or a combination of textual data, voice data, gesture data, and visual data.

18. The non-transitory computer-readable device of claim 15, wherein generating the situation definition comprises performing machine learning analysis on the collection.

19. The non-transitory computer-readable device of claim 15, wherein the condition includes an application rule, query, or application relevant event.

20. The non-transitory computer-readable device of claim 15, wherein the collection comprises a plurality of homogeneous application objects or a plurality of heterogeneous application objects.

* * * * *